United States Patent
Guarasci et al.

(10) Patent No.: US 12,216,836 B2
(45) Date of Patent: Feb. 4, 2025

(54) INTERACTIVE PEPPER'S GHOST EFFECT SYSTEM

(71) Applicant: Universal City Studios LLC, Universal City, CA (US)

(72) Inventors: Casey Guarasci, Fort Lauderdale, FL (US); Xinyu Wang, Pasadena, CA (US); Dylan Dawkins, New York, NY (US); Daniel Viruet, Orlando, FL (US); Austin Swink, Orlando, FL (US); Wilven Taveras, Kissimmee, FL (US)

(73) Assignee: Universal City Studios LLC, Universal City, CA (US)

( * ) Notice: Subject to any disclaimer, the term of this patent is extended or adjusted under 35 U.S.C. 154(b) by 392 days.

(21) Appl. No.: 17/197,902

(22) Filed: Mar. 10, 2021

(65) Prior Publication Data

US 2022/0253153 A1 Aug. 11, 2022

Related U.S. Application Data

(60) Provisional application No. 63/147,973, filed on Feb. 10, 2021.

(51) Int. Cl.
*G06F 3/0346* (2013.01)
*G02B 27/02* (2006.01)
*G06T 19/00* (2011.01)

(52) U.S. Cl.
CPC ......... *G06F 3/0346* (2013.01); *G02B 27/026* (2013.01); *G06T 19/006* (2013.01)

(58) Field of Classification Search
CPC ... G06F 3/0346; G06F 3/0304; G02B 27/026; G02B 30/56; G02B 27/01; G02B 27/144; G02B 30/40; G06T 19/006; A63J 5/021; F21V 14/02; G03B 35/20; G03B 15/10
See application file for complete search history.

(56) References Cited

U.S. PATENT DOCUMENTS

| | | | |
|---|---|---|---|
| 5,528,425 A * | 6/1996 | Beaver | G02B 27/144 352/85 |
| 5,685,625 A * | 11/1997 | Beaver | G03B 15/10 353/30 |
| 9,132,361 B2 | 9/2015 | Smithwick | |
| 9,989,777 B1 | 6/2018 | Comploi et al. | |
| 10,497,175 B2 | 12/2019 | Mount et al. | |
| 2012/0313839 A1 | 12/2012 | Smithwick et al. | |

(Continued)

FOREIGN PATENT DOCUMENTS

WO 2015181605 A2 12/2015
WO WO-2017124168 A1 * 7/2017

OTHER PUBLICATIONS

PCT/US2022/014364 International Search Report and Written Opinion mailed May 13, 2022.

*Primary Examiner* — Richard J Hong
(74) *Attorney, Agent, or Firm* — Fletcher Yoder, P.C.

(57) ABSTRACT

An interactive Pepper's Ghost system includes a sensor configured to detect a parameter indicative of an orientation of a handheld device. The Pepper's Ghost system also includes a controller configured to receive, from the sensor, sensor feedback corresponding to the parameter indicative of the orientation of the handheld device. The controller is configured to control a Pepper's Ghost visual effect based on the sensor feedback.

16 Claims, 5 Drawing Sheets

(56) References Cited

U.S. PATENT DOCUMENTS

| | | | |
|---|---|---|---|
| 2013/0010207 A1* | 1/2013 | Valik | G06F 3/0304 |
| | | | 704/E21.001 |
| 2014/0340490 A1* | 11/2014 | Duffy | G02B 30/40 |
| | | | 348/51 |
| 2015/0103510 A1* | 4/2015 | Reetz | F21V 14/02 |
| | | | 348/744 |
| 2015/0338674 A1* | 11/2015 | Cornford | G02B 30/56 |
| | | | 359/479 |
| 2016/0097971 A1* | 4/2016 | Horikoshi | G03B 35/20 |
| | | | 353/121 |
| 2016/0266396 A1* | 9/2016 | Crowder | G02B 30/56 |
| 2016/0266453 A1 | 9/2016 | Onogi et al. | |
| 2016/0266543 A1* | 9/2016 | Crowder | G02B 30/56 |
| 2016/0267577 A1* | 9/2016 | Crowder | G06Q 30/0643 |
| 2016/0267699 A1 | 9/2016 | Borke et al. | |
| 2016/0292917 A1* | 10/2016 | Dorner | G02B 27/01 |
| 2017/0103584 A1* | 4/2017 | Vats | G06T 19/20 |
| 2018/0024373 A1 | 1/2018 | Joseph et al. | |
| 2018/0348535 A1* | 12/2018 | Comploi | A63J 5/021 |
| 2019/0094562 A1* | 3/2019 | Frayne | H04N 13/346 |

\* cited by examiner

INTERACTIVE PEPPER'S GHOST EFFECT SYSTEM

CROSS-REFERENCE TO RELATED APPLICATIONS

This application claims priority from and the benefit of U.S. Provisional Application Ser. No. 63/147,973, entitled "INTERACTIVE PEPPER'S GHOST EFFECT SYSTEM AND METHOD," filed Feb. 10, 2021, which is hereby incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Theme parks, amusement parks, theaters, movie theaters, stadiums, concert halls, and the like have been created to provide guests with various immersive experiences. These entertainment venues may include show attractions (e.g., movies, plays, rides, games) that provide the guests with the immersive experiences. For example, traditional show attractions may utilize various combinations of physical show elements (or props), staging, and lighting to create various visual effects from the guest's perspective. One commonly utilized visual effect may be referred to as a Pepper's Ghost illusion. For example, a traditional Pepper's Ghost system may employ a primary stage (a first scene), a secondary stage (a second scene), and an optical beam splitter (e.g., a pane of glass) positioned to essentially combine images from each scene when viewed from an audience's point of view. Imagery from the second scene may be reflected from the beam splitter (e.g., reflected from a glass surface) toward the audience, while imagery from the first scene is transmitted through the beam splitter (e.g., transmitted through the glass). Stage lighting may be controlled to illuminate aspects of the scenes but not the beam splitter. This may increase visibility of desired scene features and limit or prevent observation of the beam splitter itself by the audience. This creates an illusion of a physical presence on the primary stage that is actually a mere reflection of the secondary stage.

While well-established effects, such as a traditional Pepper's Ghost effect, are effective illusions, it is now recognized that these traditional effects lack meaningful audience interaction. For example, the audience, which may include one or more guests, generally have no control over various aspects of a show built around such effects. In other words, the audience in such traditional systems is passive. In today's environment, in which guests are accustomed to more interaction (e.g., via video games), such passive interaction can cause a loss of interest. Further, even in shows employing audience interaction, it is presently recognized that technological limitations may cause audience interaction to be overly expensive, inaccurate, inconsequential, or any combination thereof. Accordingly, improved show attractions are desired.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from embodiments set forth below.

In an embodiment, an interactive Pepper's Ghost system includes a sensor configured to detect a parameter indicative of an orientation of a handheld device. The Pepper's Ghost system also includes a controller configured to receive, from the sensor, sensor feedback corresponding to the parameter indicative of the orientation of the handheld device. The controller is configured to control a Pepper's Ghost visual effect based on the sensor feedback.

In an embodiment, an entertainment system includes a transparent or translucent screen, a plurality of light emitters directed toward the transparent or translucent screen, a handheld device, a sensor configured to monitor an orientation of the handheld device, a controller configured to receive sensor feedback from the sensor indicative of the orientation of the handheld device, wherein the controller is configured to select at least one light emitter of the plurality of light emitters based on the sensor feedback and to activate the at least one light emitter to emit light onto the transparent or translucent screen such that a Pepper's Ghost effect is created from a perspective at the handheld device.

In an embodiment, an interactive Pepper's Ghost system includes a handheld device configured to be held by an operator, a sensor configured to monitor an orientation of the handheld device, a microphone configured to detect voice audio from the operator, a transparent or translucent screen, and a controller. The controller is configured to receive first data feedback indicative of the orientation of the handheld device from the sensor, and determine, based on the first data feedback, a location of the transparent or translucent screen toward which the handheld is pointed. The controller is also configured to receive second data feedback indicative of the voice audio from the operator, and determine, based on the second data feedback, a voice command of a plurality of available voice commands. The controller is also configured to activate, based on the location determined by the controller and the voice command determined by the controller, at least one light emitter of a plurality of light emitters such that the at least one light emitter emits light onto the location of the transparent or translucent screen to generate a Pepper's Ghost effect.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to an interactive Pepper's Ghost system and method for entertainment venues (e.g., theme parks, amusement parks, theaters). More particularly, the present disclosure relates to a system that controls a Pepper's Ghost effect based on interaction from a guest.

Various entertainment venues may provide guests with a number of immersive, interactive experiences. For example, entertainment venues may include show attractions that utilize various combinations of physical show elements (or "props") and lights to cause various visual effects. However, in certain traditional embodiments, these show attractions may lack audience interaction. Further, in traditional show attractions that do employ audience interaction, the audience interaction may not exert or cause any control over the show attraction. For example, a story told by the show attraction may be fixed and the audience may lack meaningful control over changing certain aspects of the story.

In accordance with the present disclosure, an interactive Pepper's Ghost system may enable audience interaction that, for example, enables some control over aspects of a scene or story. The audience control may be enabled by monitoring guest movement (or movement of a device controlled by the guest) and propagated or facilitated at least in part by a Pepper's Ghost visual effect. In accordance with the present disclosure, "Pepper's Ghost" may refer to a visual effect enabled by various staging/lighting structures and techniques that include a primary stage (a first scene), a secondary stage or dark room (a second scene), and an optical beam splitter (e.g., a pane of glass) positioned to essentially combine images from each scene when viewed from the guest's point of view. Imagery from the second scene (e.g., from the dark room, which may not be directly visible to the audience) may be reflected from the beam splitter (e.g., reflected from a glass surface) toward the audience, while imagery from the first scene is transmitted through the beam splitter (e.g., transmitted through the glass). Stage lighting may be controlled to illuminate aspects of the scenes but not the beam splitter. This may increase visibility of desired scene features and limit or prevent observation of the beam splitter itself by the audience. This creates an illusion of a physical presence on the primary stage that is actually a mere reflection of the secondary stage.

The interactive Pepper's Ghost system in accordance with the present disclosure includes a controller and a handheld device. The handheld device may be, for example, a confetti cannon, a wand, a key, a console controller, a cell phone, or some other handheld device. An orientation of the handheld device (and in some embodiments a position of the handheld device) may be monitored by the controller. In some embodiments, infrared light detection may be employed to enable the controller to monitor the orientation of the handheld device. For example, in an embodiment, the handheld device may include an infrared light emitter, and the controller may be communicatively coupled with an infrared sensor (or array of infrared sensors) configured to detect the infrared light emitted from the infrared light emitter of the handheld device. In another embodiment, the handheld device may include an infrared light reflector, a separate infrared light emitter may emit infrared light toward the infrared light reflector of the handheld device, and the controller may be communicatively coupled with an infrared light sensor (or array of infrared sensors) configured to detect infrared light reflected by the infrared light reflector of the handheld device. In yet another embodiment, different aspects of the handheld device may be detected (e.g., a shape, barcode, reflective coating), such as by a camera. Further, gyroscopes and/or accelerometers located at the handheld device may also be employed to monitor an orientation and location of the handheld device.

Based on the sensor feedback received by the controller from the infrared light sensor or other sensors (e.g., camera, gyroscope, accelerometer), the controller may determine the orientation of the handheld device, such as a toy magic sword. For example, the controller may determine a direction in which the handled device (e.g., toy magic sword) is directed or pointed. While infrared light detection or other sensor devices may be used to determine a position of the handheld device, in some embodiments the position of the handheld device is fixed (e.g., in a pre-defined zone) such that the position of the handheld device is known relative to the other components of the system. Based on the orientation and position of the handheld device, the controller may control a Pepper's Ghost effect that simulates a visual effect perceived by the guest as though it is caused by the handheld device. For example, if the handheld device is a toy magic sword as previously described, the controller may control a Pepper's Ghost visual effect to simulate a spell cast by the magic sword. The Pepper's Ghost visual effect is described in detail below and may be defined as an illusion of the presence of a feature (e.g., an image, object, item, prop or the like) in a scene, wherein the feature is actually reflected from a separate scene that is not directly viewable by an audience positioned to observe the Pepper's Ghost visual effect.

The interactive Pepper's Ghost system may include various features that enable the Pepper's Ghost effect. For example, the interactive Pepper's Ghost system may include a stage and a transparent or translucent screen (e.g., beam splitter) disposed between the handheld device and the stage. In general, a more transparent screen (e.g., beam splitter) may enable a more authentic effect than a less transparent screen. For conciseness, the transparent or translucent screen may be referred to in certain instances below as "screen." In general, the screen may be invisible or mostly invisible from a perspective of an operator (e.g., guest) holding the handheld device. In some embodiments, the handheld device, the transparent or translucent screen, and the stage may be disposed in a row or straight line. That is, a line of sight from the handheld device, or the guest controlling the handheld device, may extend from a location of the handheld device, through the transparent or translucent screen, and into the stage. A dark room may be disposed adjacent to the transparent or translucent screen and may be offset from the above-described line of sight. The dark room may include dark walls and a number of controllable lights configured to project or direct light toward the transparent or translucent screen. Further, the dark room may not be directly visible to an operator of the handheld device and other guests in the audience. In some embodiments, the controllable lights may be disposed in a grid, and certain ones of the controllable lights may be triggered or activated by the controller based on the above-described sensor feedback to project or direct light toward certain areas of the transparent or translucent screen. The transparent or translucent screen may be disposed at an angle, such as a 45-degree angle, with respect to the above-described line of sight, and an additional angle, such as an additional 45-degree angle, with respect to a direction of the light provided via the lights disposed in the dark room.

Angling the screen as described above enables the light directed from the dark room toward the screen to appear, from a perspective of a guest at or adjacent to the handheld device, as though it corresponds to a visual effect occurring on the stage. That is, while the light from the dark room is projected onto the screen between the handheld device and the stage, the light reflecting off the screen appears to the guest as though it is a visual effect occurring behind the screen, which is invisible or mostly invisible to the guest, and on the stage. In some embodiments, physical items may be disposed in the dark room and the above-described lights disposed in the dark room may cause an illumination of the physical items and corresponding reflection onto the transparent or translucent screen, thereby giving the impression that the physical items in the dark room also exist in the stage behind the transparent or translucent screen. In other embodiments, the above-described lights may directly simulate visual effects onto the transparent or translucent screen without any other physical items disposed in the dark room.

In accordance with the present disclosure, the handheld device may include a toy cannon that simulates shooting confetti, water, smoke, or the like onto the stage behind the transparent or translucent screen. In some embodiments, the stage may include various show elements, or props, that interact with the Pepper's Ghost effect. For example, a visual effect may simulate a particular appearance or disposition associated with one of the props (e.g., confetti landing on a chair). In some embodiments, the controller may cause a physical effect to the prop corresponding to, or working in conjunction with, the visual effect. For example, the visual effect caused by the lights from the dark room and corresponding to the orientation of the handheld device may simulate an appearance of fire, smoke, vapor, electricity, lighting, water, snow, or the like being emitted from the handheld device, and the controller may move the prop to correspond to the visual effect (e.g., forward movement, backward movement, side-to-side movement, rotation, breaking, splitting, joining). In general, the above-described system enables a guest to operate the handheld device to cause a visual Pepper's Ghost effect that simulates guest interaction with the stage, props on the stage, and a scene or story conveyed by the stage and props.

In some embodiments, a microphone is employed to capture a voice command by the operator (e.g., guest) of the handheld device (e.g., confetti cannon). The controller may be communicatively coupled with the microphone and configured to receive data feedback from the microphone. The voice command may correspond to a particular visual effect of a number of available visual effects stored to a memory of the controller. For example, a first voice command may cause a first visual effect (e.g., red, orange, and yellow light graphics or light simulating fire) and a second voice command may cause a second different visual effect (e.g., blue, white, and gray graphics or light simulating water). Accordingly, the system causes a Pepper's Ghost visual effect at a location corresponding to an orientation of the handheld device, and having aesthetic characteristics (e.g., color) corresponding to a voice command. These and other features are described in detail below.

Figure 1:
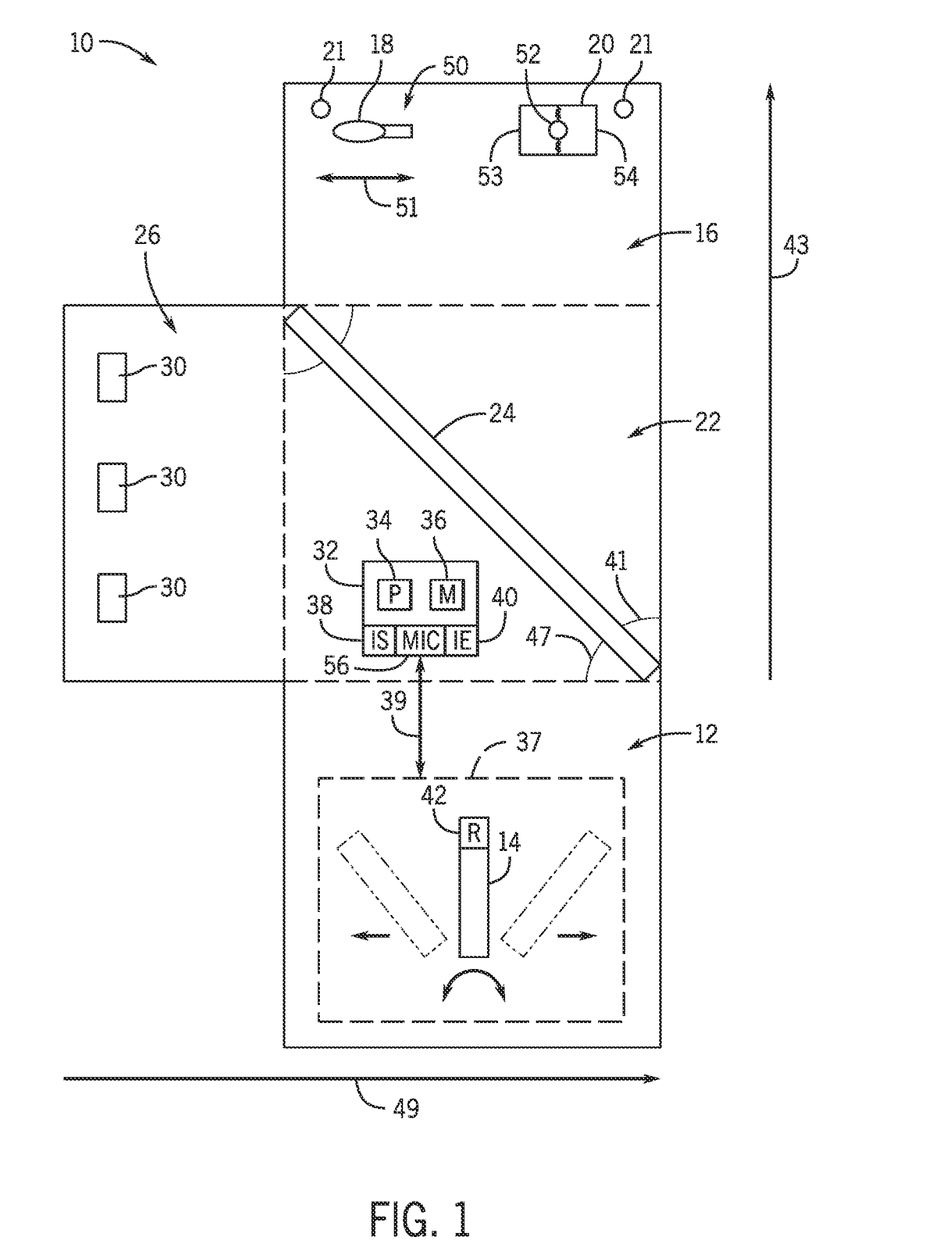
FIG. 1 is an overhead view of an interactive Pepper's Ghost system, in accordance with an aspect of the present disclosure.

Continuing with the drawings, FIG. 1 is an overhead view of an embodiment of an interactive Pepper's Ghost system 10. In the illustrated embodiment, the system 10 includes an audience compartment 12 in which a handheld device 14 (e.g., a confetti cannon), is disposed, a stage compartment 16 in which show elements 18, 20 (or props) and at least one projector 21 are disposed, a midsection compartment 22 in which a transparent or translucent screen 24 (referred to as "screen" below) is disposed, and a dark compartment 26 in which effect lights 30 (e.g., LED lights, a display, a television screen) are disposed. As described in detail below, the system 10 may utilize the above-described compartments 12, 16, 22, 26 (referred to in certain instances below as "rooms") and corresponding components to simulate a visual effect in the stage compartment 16 caused by the handheld device 14. That is, the visual effect may coincide with a position and orientation of the handheld device 14 such that the position and orientation of the visual effect is aligned with the positioned and orientation of the handheld device 14 such that, for example, the effect appears to have originated from the handheld device 14.

The system 10 may also include a controller 32 having a processor 34 (e.g., processing circuitry) and a memory 36 (e.g., memory circuitry), an infrared sensor 38 (e.g., a camera), an infrared emitter 40, and an infrared reflector 42. The memory 36 may include instructions stored thereon that, when executed by the processor 34, cause the controller 32 to perform various functions. While the controller 32, the infrared sensor 38, and the infrared emitter 40 are illustrated in the midsection compartment 22 of the system 10 (i.e., adjacent to the screen 24), it should be understood that the controller 32, the infrared sensor 38, and the infrared emitter 40 may be disposed in other compartments of the system 10. Further, any one of the controller 32, the infrared sensor 38, or the infrared emitter 40, if disposed in the midsection compartment 22, may be disposed in an area that does not substantially block a line of sight from the handheld device 14, through the screen 24, and into the stage compartment 16. In an embodiment, the controller 32, the infrared sensor 38, and the infrared emitter 40 may be small enough to be positioned within the above-described line of sight without substantially reducing an experience of an operator (e.g., guest) of the handheld device 14 or other guest positioned in the audience compartment 12.

In the illustrated embodiment, the infrared emitter 40 may be configured to emit infrared light toward the handheld device 14, and an infrared reflector 42 on the handheld device 14 may reflect the infrared light. The infrared reflector 42 may include a mechanism, such as a filter, that reflects light (e.g., infrared light) having a wavelength within a particular range of wavelengths (e.g., between approximately 700 nanometers and 1 millimeter). The infrared sensor 38 may be configured to detect the reflected infrared light. In some embodiments, the infrared sensor 38 may include a grid of sensors configured to detect the infrared light. In some embodiments, no infrared reflector is employed at the handheld device 14 and instead the infrared emitter 40 is disposed at the handheld device 14, such that the infrared light emitted by the infrared emitter 40 of the handheld device 14 is detected by the infrared sensor 38. In either case, the controller 32 may receive sensor feedback from the infrared sensor 38 indicative of an orientation of the handheld device 14. In some embodiments, the sensor feedback may also be indicative of a position of the handheld device 14 (e.g., including any combination of X, Y, and Z coordinates). However, in the illustrated embodiment, the handheld device 14 is disposed at or within a zone 37 whose coordinates are known by the controller 32 (e.g., as the zone 37 is positioned a pre-defined and known distance 39 from the infrared sensor 38), such that an approximate position of the handheld device 14 is known and need not be monitored. Other position and orientation monitoring is also possible, such as via gyroscopes, accelerometers, shape recognition cameras, communication signals (e.g., Bluetooth), and the like employed at the controller 32 and/or the handheld device 14.

Based on the above-described sensor feedback (e.g., infrared feedback, camera feedback, gyroscope feedback, accelerometer feedback), the controller 32 may control the lights 30 disposed in the dark room 26 which, when directed toward the screen 24, simulate a visual effect perceived by a guest in the audience compartment 12 as though it occurs in, or interacts with, the stage 16. For example, the lights 30 may be disposed in a grid (e.g., via an array of LED lights). Further, the lights 30 may include an array of screens or LED panels that can provide detailed graphic effects (e.g., an animated explosion). The controller 32 may utilize the above-described sensor feedback to trigger certain of the lights 30 in the grid such that the triggered ones of the lights 30 cause visual effects associated with the position and orientation of the handheld device 14. For example, a guest may point the handheld device 14 toward the show element 18 in the stage compartment 16 of the system 10. The controller 32 may determine at least the orientation of the handheld device 14 based on the above-described sensor feedback. The controller 32 may then trigger certain ones of the lights 30 to direct light toward certain areas of the screen 24. The screen may be disposed at an angle 41 (e.g., approximately 45-degree angle+/−2 degrees) relative to a line of sight 43 through the audience compartment 23, the midsection compartment 22, and the stage compartment 16. The screen 24 may also be disposed at an angle 47 (e.g., approximately 45-degree angle+/−2 degrees) with respect to a line of sight 49 from the dark compartment 26 toward the midsection compartment 22.

Due to the above-described angles 41, 47 of the screen 24, and the fact that the screen 24 includes a transparent or translucent material, the light reflected onto the screen 24 from the lights 30 in the dark room (e.g., triggered by the controller 32) may cause a visual effect that appears to an operator of the handheld device 14 as though it occurs in the stage compartment 16, aligned with the show element 18 toward which the handheld device 14 is pointed. Accordingly, from the perspective of an operator of the handheld device 14, or any other guest positioned in the audience compartment 12 of the system 10, a visual effect is perceived as though it occurs in the stage compartment 16 and originates from the handheld device 14. As previously described, a more transparent material for the screen 24 may improve an authenticity of the visual effect. Other than the controlled actuation of the lights 30 in the dark compartment 26, the dark compartment 26 may include a dark (e.g., black) material that reduces any undesired light reflection onto the screen 24 (e.g., light other than the light directed toward the screen 24 via the lights 30 in the dark compartment 26).

In some embodiments, a microphone 56 communicatively coupled with the controller 32 may also be employed to trigger the visual effect. For example, the microphone 56 may detect a voice command (e.g., from an operator of the handheld device 14) indicative of a command to cause a visual effect. The microphone 56 and/or controller 32 may include voice recognition software configured to determine the voice command and an effect type associated with the voice command. Several commands and corresponding different visual effects may be possible. For example, if the handheld device 14 is an effect cannon, several voice or audio commands may correspond to several different types of virtual effect material (e.g., water, confetti, fireworks) that can be expelled by the cannon. The visual effect associated with the various different types of visual effect material can be simulated as though they are cast from the handheld device 14 (e.g., cannon) toward or onto various show elements 18, 20 or other areas of the stage compartment 16. Thus, the controller 32 may monitor the orientation of the handheld device 14 and may trigger, based on voice commands detected by the microphone 56 and the orientation of the handheld device 14, the appropriate lights 30 in the dark compartment 26 to cause the appropriate visual effect (e.g., water) perceived by the operator as occurring at the appropriate show element(s) 18, 20 or other areas in the stage compartment 16. That is, the controller 32 may determine which lights 30 to trigger based on the orientation monitoring of the handheld device 14 (e.g., via the sensor 38), and the controller 32 may determine when to trigger the lights based on the audio or voice command (e.g., via the microphone 56 feedback). In some embodiments, each light 30 may include various colored lights. For example, each light 30 may include multiple LED lights corresponding with multiple different colors. As described above, various types of different visual effects may be caused in response to various types of different audio or voice commands. A first audio command corresponding to a first spell may cause a first visual effect having a first color or combination of colors, and a second audio command corresponding to a second spell may cause a second visual effect having a second color or combination of colors. Accordingly, feedback from the microphone 56 may be employed to determine the spell (e.g., desired visual effect), and the controller 32 may control the lights 30 such that the appropriate color(s) corresponding to the determined spell are directed toward the screen 24.

As previously described, at least on projector 21 may be disposed in the stage compartment 16. While two projectors 21 are illustrated in FIG. 1, any number of projectors is possible. The projectors 21 may be configured to illuminate the stage 16 and corresponding show elements 18, 20 (e.g., at all times during the show or attraction). Further, actuation assemblies 50, 52 may be employed to cause movement of the show elements 18. For example, the actuation assembly 50 associated with the show element 18 may include a motorized track-and-trolley that moves the show element 18 laterally 51 across a track, as shown. The actuation assembly 52 may include a motorized fastener that is disengaged (e.g., via control by the controller 32) to cause the corresponding show element 20 to break into two pieces 53, 54. Other actuation assemblies are also possible in accordance with the present disclosure.

Control of the show elements 18, 20 (e.g., via the actuation assemblies 50, 52) may coincide with control of the lights 30 in the dark room 26 based on the sensor feedback associated with the orientation of the handheld device 14 and/or voice commands. For example, the controller 32 may simulate the visual effect via the lights 30 such that the visual effect appears to occur at the show element 18 as the show element 18 is moved laterally 51 via the actuation assembly 50. In one example, the guest may direct the handheld device 14 toward the show element 18 and provide a command intended to move the show element 18 as though the handheld device 14 can control gravity. The controller 32 may receive sensor feedback from the infrared sensor 38 (or some other orientation monitoring sensor) corresponding to the orientation of the handheld device 14 and feedback from the microphone 56 corresponding to the command by the guest. The controller 32 may cause the visual effect, via actuating certain of the lights 30 to direct light toward certain areas of the screen 24, such as simulating an appearance of electricity being emitted from the handheld device 14 toward the show element 18. Additionally, the controller 32 may instruct movement of the show element 18 to correspond with the visual effect. It should be noted that the above-described information exchange components (e.g., at least the controller 32, the infrared sensor 38, the microphone 56, the lights 30, and the show elements 18, 20) may be wirelessly connected via an network system 59 (e.g., an Internet system). Certain of these components may be additionally or alternatively wire-connected.

Figure 2:
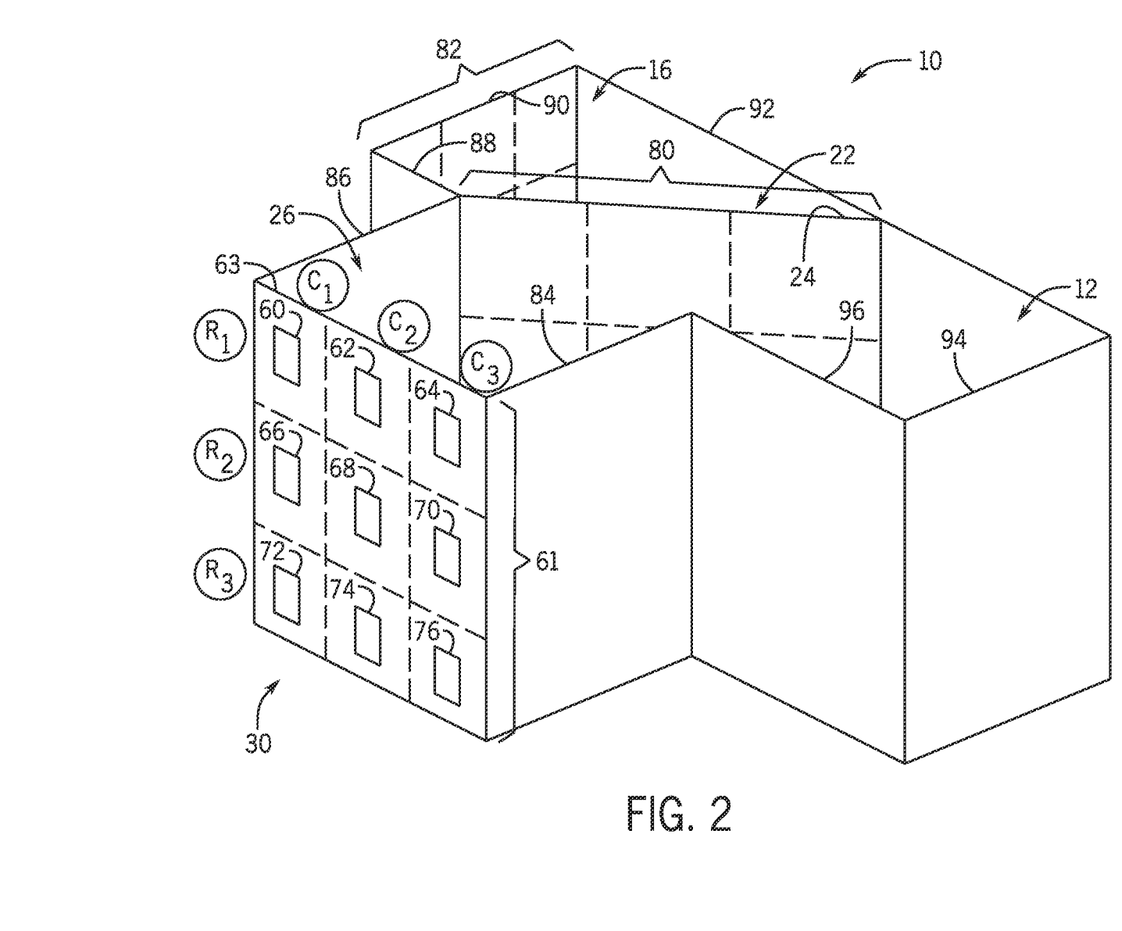
FIG. 2 is an overhead perspective view of the interactive Pepper's Ghost system of FIG. 1, in accordance with an aspect of the present disclosure.

FIG. 2 is an overhead perspective view of an embodiment of the interactive Pepper's Ghost system 10 of FIG. 1. In the illustrated embodiment, the lights 30 included in the dark compartment 26 of the system 10 may be arranged in a grid 61, as previously described. It should be noted that, for clarity, the lights 30 (e.g., individual lights, LED arrays or panels, display screens) are illustrated through a backside of a dark wall 63 of the dark compartment 26. However, it should be understood that the lights 30 may not be visible through the backside of the dark wall 63 and are instead positioned inside the dark compartment 26 and directed toward the screen 24. In general, the dark compartment 26 may include dark walls (e.g., the dark wall 63, a dark wall 84, and a dark wall 86) that reduce undesired reflections of light onto the screen 24. The system 10 may also include multiple other walls 88, 90, 92, 94, 96 defining the various compartments 16, 22, 12 of the system 10. In some embodiments, the wall 92 may traverse the stage compartment 16, the mid-section compartment 22 having the screen 24, and the audience compartment 12. In other embodiments, the wall 92 may include three separate walls (or panels) for each of the compartments 16, 22, 12. The walls 63, 84, 86, 88, 90, 92, 94, 96 will be described in detail with reference to later drawings.

The grid 61 of the lights 30 corresponding to the dark compartment 26 may include columns C1, C2, and C3 and rows R1, R2, and R3. A first light 60 may be disposed at C1, R1, a second light 62 may be disposed at C2, R1, a third light 64 may be disposed at C3, R1, a fourth light 66 may be disposed at C1, R2, a fifth light 68 may be disposed at C2, R2, a sixth light 70 may be disposed at C3, R2, a seventh light 72 may be disposed at C1, R3, an eight light 74 may be disposed at C2, R3, and a ninth light 76 may be disposed at C3, R3. The lights 60, 62, 64, 66, 68, 70, 72, 74, 76 may be collectively referred to as the lights 30. Further, it should be noted that each one of the lights 60, 62, 64, 66, 68, 70, 72, 74, 76 may include multiple lights having multiple different colors, or may include a single light capable of emitting multiple different colors. For example, the light 60 may be capable of emitting red, green, and blue light, among others.

In the illustrated embodiment, the screen 24 may include a grid 80 corresponding to the grid 61 of the lights 30 in the dark compartment 26. For example, control of the first light 60 disposed in C1, R1 of the grid 61 may cause the first light 60 to direct light to a corresponding area of the grid 80 associated with the screen 24. Of course, the grid 80 associated with the screen 24 is not visible and simply corresponds to the physical locations of the various lights 30 in the dark compartment 26. Further, a grid 82 in the stage compartment 16 may correspond with the grid 80 of the screen 24 and the grid 61 of the lights 30 in the dark compartment 26. Again, the grid 82 in the stage compartment 16 is not visible and instead simply corresponds to the physical locations of the various lights 30 in the dark compartment 26. By controlling, for example, the first light 60 in C1, R1 of the grid 61, light is directed toward the corresponding area of the grid 80 of the screen 24, and the light is reflected by the screen 24 to simulate a visual effect, from the perspective of a guest in the audience compartment 23, occurring in a corresponding area of the grid 82 of the stage compartment 16. Control of the lights 30 in the dark compartment 26 may be conducted in the manner described above with respect to FIG. 1.

Referring back to FIG. 1, it should be noted that only one controller 32 having one processor 34 and memory 36 is illustrated. However, it should be understood that multiple controllers may be employed to communicate with each other to achieve the above-described effects. For example, the controller 32 in FIG. 1 may be representative of any number of controllers, such as a first controller configured to receive sensor feedback from the infrared sensor 38 and the microphone 56, a second controller communicatively coupled with the first controller and configured to activate various ones of the lights 30, and a third controller configured to control operation of the stage compartment 16 and the corresponding show elements 18, 20. Other control schemes are also contemplated in accordance with the present disclosure.

Figure 3:
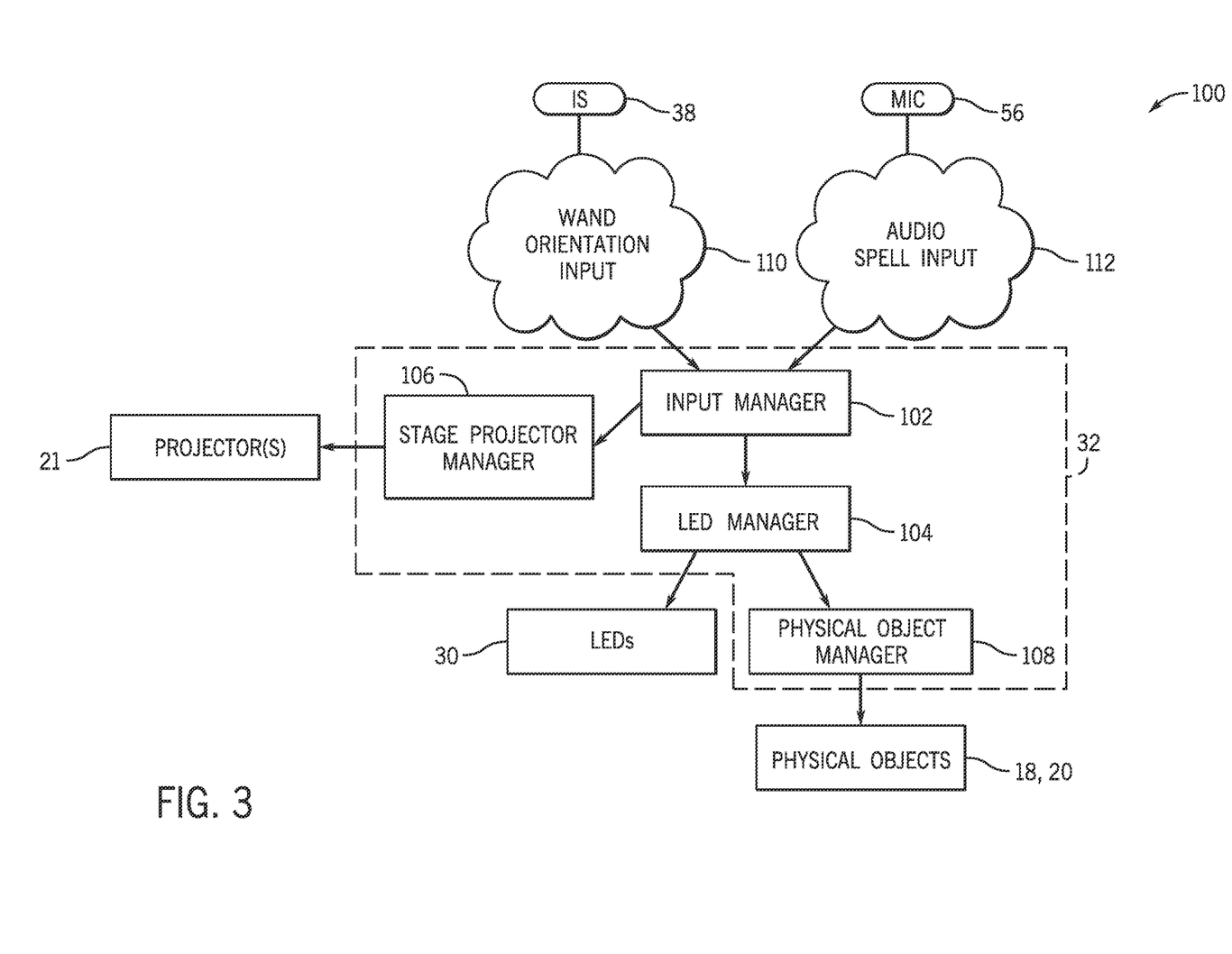
FIG. 3 is a schematic block diagram illustrating a control scheme for controlling the interactive Pepper's Ghost system of FIG. 1, in accordance with an aspect of the present disclosure.

For example, FIG. 3 is a schematic block diagram illustrating an example of a control scheme 100 for controlling the interactive Pepper's Ghost system 10 of FIG. 1. In FIG. 1, a single controller 32 is illustrated. However, the single controller 32 may be representative of multiple controllers working in conjunction to cause the various effects described with respect to FIG. 1. For example, in FIG. 3, the "controller 32" may include four separate controller components, including an input manager 102, an LED manager 104, a stage projector manager 106, and a physical object manager 108. Each of the control components (or managers) 102, 104, 106, 108 may include a dedicated processor and memory. That is, the processor 34 and memory 36 illustrated in FIG. 1 may be representative of dedicated processors and memories for each of the control components (or managers) 102, 104, 106, 108 illustrated in FIG. 3.

The input manager 102 in FIG. 3 may be configured to receive a device orientation input from the infrared sensor 38 (or some other input sensor, such as a camera, gyroscope, accelerometers, or the like) and an audio input 112 from the microphone 56. The input manager 102 may determine various control features based on the inputs 110, 112 as previously described. The input manager 102 may include, for example, a video game console. The LED manager 104 may be configured to receive data from the input manager 102 based on the processing by the input manager 102 of the orientation input 110 and the audio spell input 112. For example, the input manager 102 may indicate to the LED manager 104, via the data communicated thereto, the orientation of the handheld device 14 of FIG. 1 and the operation intended to be implemented based on the audio spell input 112. The LED manager 104 may then control the appropriate ones of the lights 30 (LEDs in the illustrated embodiment) to simulate the Pepper's Ghost effect in accordance with the orientation input 110 and the audio input 112, as previously described. The LED manager 104 may also communicate data to the physical object manager 108 indicative of which lights 30 will be, or are being, activated. The LED manager 104 may also indicate the type of effect being activated to the physical object manager 108. The physical object manager 108 may then control the show elements 18, 20 (referred to as physical objects in FIG. 3) in accordance with the data received from the LED manager 104. For example, if an effect corresponds to a spray of high pressure water, the object manager 108 may control a prop to move in response to impact by the virtual stream of water.

The input manager 102 may also communicate data to the stage projector manager 106. As previously described, one or more stage projectors 21 may be used to illuminate a stage visible to an operator of the handheld device 14 (e.g., wand) of FIG. 1. In certain embodiments, the projectors 21 may be controlled to increase or decrease a brightness of light emitted from the projectors 21. Control of the projectors 21 may improve an authenticity of the Pepper's Ghost visual effect provided in accordance with the discussion above. Further, the projectors 21 may be selectively controlled to correspond to the various types of spells being simulated by the system. For example, one spell may cause the stage visible to the guest to go dark or darker, namely, by controlling the projectors 21 to reduce a brightness of the light or negate the light emitted from the projectors 21. The above-described control scheme is one example of various control components (e.g., the input manager 102, the LED manager 104, the stage projector manager 106, the physical object manager 108) that may communicate with each other to achieve the desired Pepper's Ghost effect discussed in detail with reference to FIGS. 1 and 2. However, other schemes are also possible.

Figure 4:
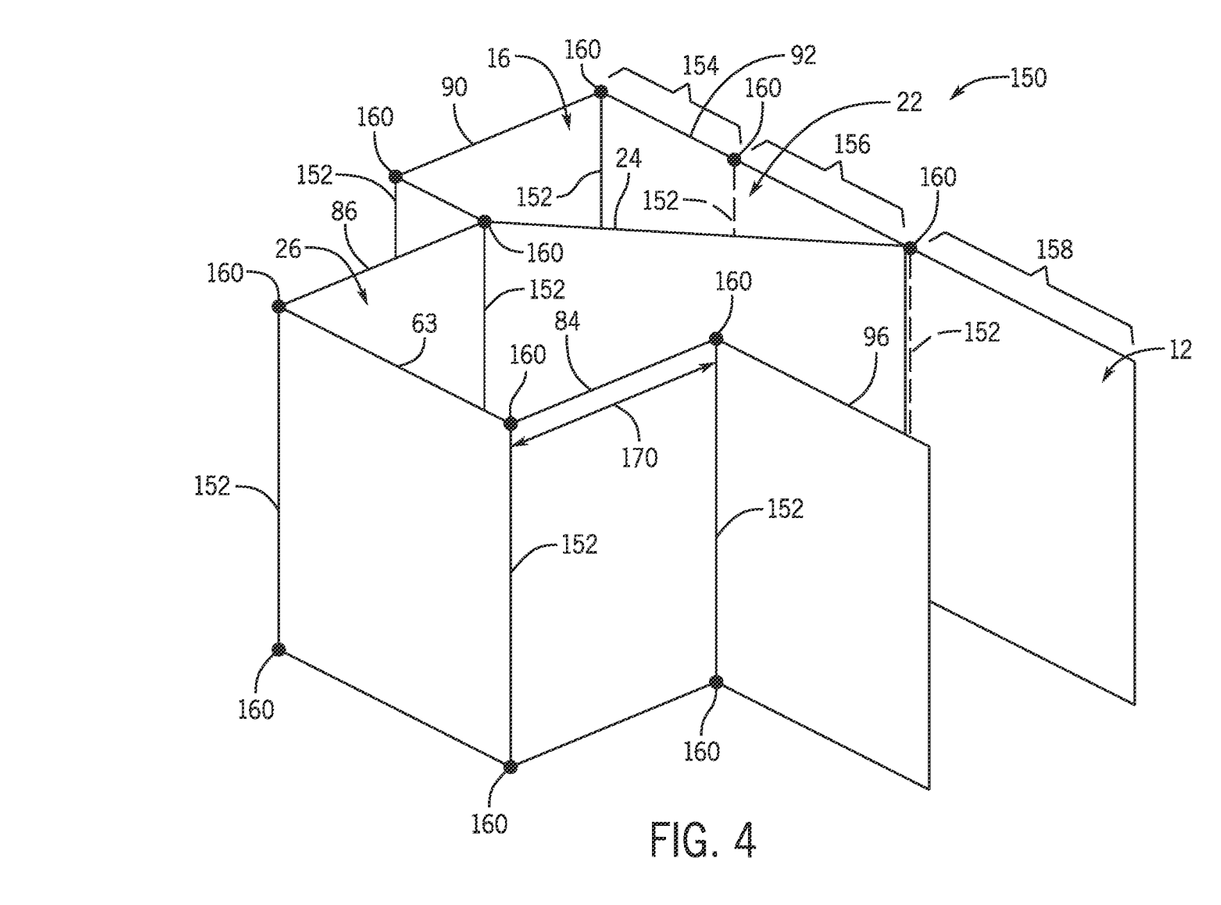
FIG. 4 is an overhead perspective view of a foldable housing for the interactive Pepper's Ghost system of FIG. 1, in accordance with an aspect of the present disclosure.

FIG. 4 is an overhead perspective view of an embodiment of a foldable housing 150 for the interactive Pepper's Ghost system 10 of FIG. 1. The foldable housing 150 may include the various walls 63, 84, 86, 90, 92, 96 illustrated in FIG. 2 defining the various compartments 12, 16, 22, 26 (or rooms) illustrated in FIG. 2. The wall 94 illustrated in FIG. 2 is removed in FIG. 4, but in certain embodiments, the foldable housing 150 of FIG. 4 may include the wall 94 of FIG. 2.

In the embodiment illustrated in FIG. 4, the various walls 63, 84, 86, 90, 92, 96 may be connected at joints 152. Further, the wall 92 may include three separate walls (or panels) 154, 156, 158 connected via the joints 152. The joints 152 may include hinges 160 (represented by circles in the illustrated embodiment) configured to enable the walls 63, 84, 86, 90, 92, 96 (including the panels 154, 156, 158 of the wall 92) to fold relative to each other. In some embodiments, the screen 24 utilize to generate the Pepper's Ghost effect may be removed from the foldable housing 150 before the foldable housing 150 is folded into a stack. In other embodiments, the screen 24 may attach to one of the walls 63, 84, 86, 90, 92, 96 or panels 154, 156, 158 and/or may be sized to be folded into the stack. Further, it should be noted that the sizes and dimensions of the features of the foldable housing 150 and screen 24 in FIG. 4 are mere examples and should not be taken as exact. In certain embodiments, all the walls 63, 68, 86, 90, 92, 96 and panels 154, 156, 158 may include similar widths (e.g., distance 170 between two joints 152). The foldable housing 150, one example of which is illustrated in FIG. 4, may enable mobility and easier storage of the system.

Figure 5:
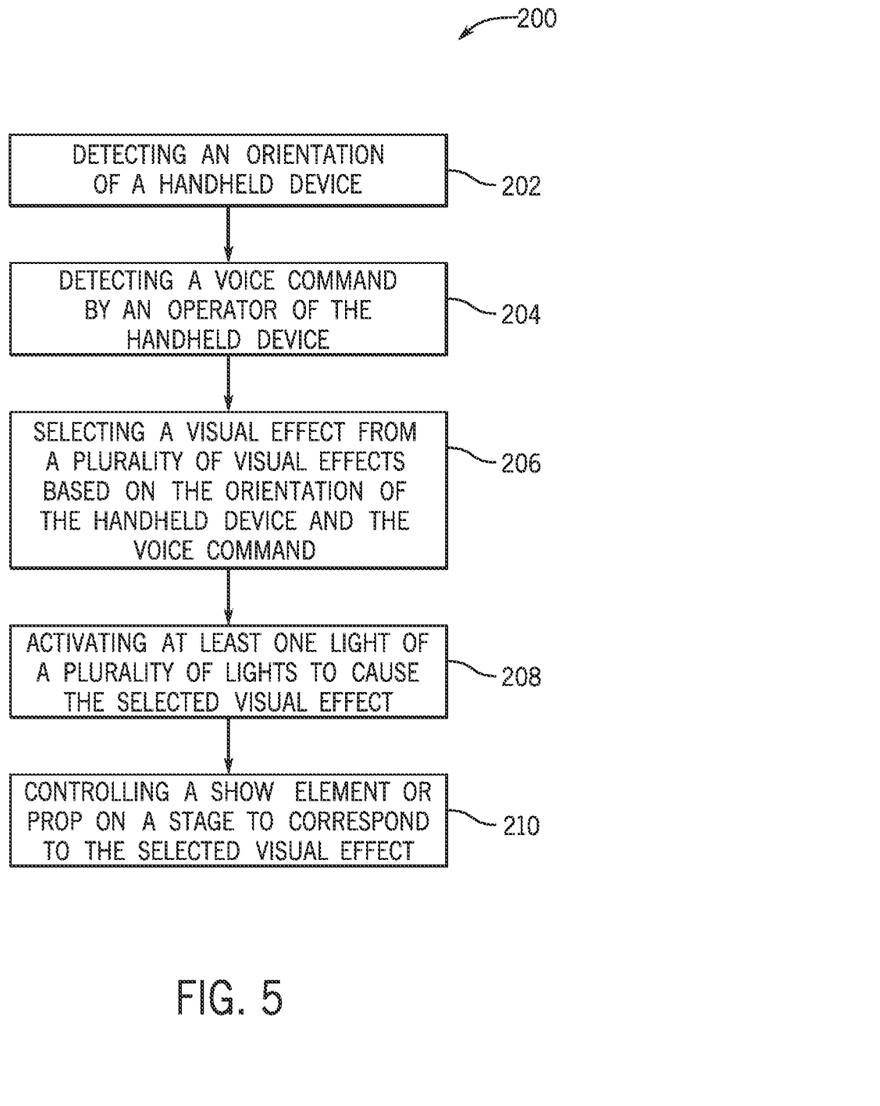
FIG. 5 is a process flow diagram illustrating a method of operating the interactive Pepper's Ghost system of FIG. 1, in accordance with an aspect of the present disclosure.

FIG. 5 is a process flow diagram illustrating an embodiment of a method 200 of operating the interactive Pepper's Ghost system 10 of FIG. 1. The method 200 includes detecting (block 202) an orientation of a handheld device. For example, as previously described, the orientation of the handheld device, such as a toy magic sword, may be monitored via an infrared light assembly described with respect to FIG. 1 or other monitoring devices (e.g., shape detecting cameras). Additionally or alternatively, other sensors such as gyroscopes and accelerometers employed at the handheld device may be utilized to detect the orientation of the handheld device. A controller may receive data feedback from the sensor or sensors described above, and may determine the orientation of the handheld device (e.g., a direction the handheld device is pointed, or a location or object at which the handheld device is pointed).

The method 200 also includes detecting (block 204) a voice command by an operator of the handheld device. For example, as previously described, a number of voice commands corresponding to various types of visual effects may be possible. The above-described controller may include voice recognition software that determines the voice command from the number of voice commands available. For example, a voice command of "fire" may cause a first visual effect (e.g., an effect that looks like fire or a stream of fire) and a voice command of "water" may cause a second visual effect (e.g., an effect that looks like a stream of water). A microphone may detect the voice command and the controller may receive data feedback from the microphone indicative of the voice command.

The method 200 also includes selecting (block 206) a visual effect from a number of available visual effects based on the orientation of the handheld device and the voice command. For example, as previously described, the voice command may be utilized by the controller to determine an aesthetic of the visual effect (e.g., fire, smoke, vapor, electricity, lighting, water, snow). The orientation of the handheld device may be utilized by the controller to determine a location at which the visual effect is created. For example, as previously described, the system may include the handheld device, a stage across from a zone of the handheld device (e.g., audience seating), and a transparent or translucent screen disposed between the handheld device and the stage. The operator may point the handheld device toward a location of the stage and/or a show element or prop (e.g., physical object) disposed on the stage. The operator may announce instructions (e.g., a spell). Based on the detected orientation of the handheld device, the controller may activate at least one light disposed in a dark room or compartment to direct light toward an appropriate area of the transparent or translucent screen. From the perspective of the operator of the handheld device, the light reflected off the transparent or translucent screen may cause a Pepper's Ghost effect that simulates a visual effect occurring in the stage area at the location (or show element) toward which the handheld device is pointed.

The method 200 also includes controlling (block 210) the above-described show element or prop on the stage to correspond to the selected visual effect caused by activation of the at least one light in block 208. For example, control of the show element may coincide with the visual effect. Indeed, the visual effect directed toward the show element may coincide with a movement (e.g., lateral movement, back and forth movement, breaking, splitting, joining) of the show element. The controller may time activation of the at least one light and the movement of the show element such that they occur substantially simultaneously and/or in an order that gives the operator of the handheld device the impression that handheld device and spell caused the visual effect and the movement of the show element.

The above-described interactive Pepper's Ghost system may enable improved audience interaction with a show attraction at an entertainment venue. Improved audience interaction, which may enable the audience (e.g., a guest) to control various aspects of the show attraction may improve guest attentiveness and entertainment.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive Pepper's Ghost system, comprising:
 a handheld device;
 a stage space;
 a transparent or translucent screen positioned between the handheld device and the stage space;
 a sensor configured to detect a parameter indicative of an orientation of the handheld device; and
 a controller configured to:
  receive, from the sensor, sensor feedback corresponding to the parameter indicative of the orientation of the handheld device;
  determine, based on the sensor feedback, a location in the stage space at which the handheld device is pointed; and
  generate a Pepper's Ghost visual effect using the transparent or translucent screen to simulate an effect at the location in the stage space.

2. The interactive Pepper's Ghost system of claim 1, comprising an infrared light emitter configured to direct infrared light toward the handheld device, wherein the handheld device comprises an infrared reflector configured to reflect the infrared light, and wherein the sensor comprises an infrared sensor configured to detect the infrared light.

3. The interactive Pepper's Ghost system of claim 1, comprising a light source communicatively coupled with the controller, wherein the controller is configured to generate the Pepper's Ghost visual effect by controlling the light source to cause a projection of light onto the transparent or translucent screen.

4. The interactive Pepper's Ghost system of claim 1, wherein the stage space comprises a show element disposed therein, and wherein the controller is configured to generate the Pepper's Ghost visual effect such that the effect aesthetically interacts with the show element from a perspective at or adjacent to the handheld device.

5. The interactive Pepper's Ghost system of claim 4, comprising an actuator configured to cause a movement of the show element, wherein the controller is configured to control the actuator based on the sensor feedback such that the movement of the show element coincides with the effect.

6. The interactive Pepper's Ghost system of claim 1, comprising a light source communicatively coupled with the controller, wherein the light source comprises a plurality of LED lights arranged in a grid, wherein the controller is configured to determine a row and a column of the grid based on the location, and wherein the controller is configured to activate at least one LED light of the plurality of LED lights, the at least one LED light being positioned within the row and the column, to cause a projection of light from the at least one LED light onto the transparent or translucent screen to generate the Pepper's Ghost visual effect.

7. The interactive Pepper's Ghost system of claim 1, comprising:
 a first room configured to receive an audience member holding the handheld device, wherein the first room is defined by at least one first wall;
 a second room configured to receive a transparent or translucent screen of the interactive Pepper's Ghost system, wherein the second room is connected to the first room and defined by at least one second wall;
 a third room configured to receive or define the stage space, wherein the third room is connected to the second room such that the first room, the second room, and the third room are positioned along a straight line, and wherein the third room is defined by at least one third wall; and
 a fourth room configured to receive a light source, wherein the fourth room is connected to the second room and offset from the straight line, and wherein the fourth room is defined by at least one fourth wall.

8. The interactive Pepper's Ghost system of claim 7, wherein the at least one first wall, the at least one second wall, the at least one third wall, and the at least one fourth wall are connected at joints via hinges such that the at least one first wall, the at least one second wall, the at least one third wall, and the at least one fourth wall are foldable into a stack.

9. An entertainment system, comprising:
 a stage space;
 a handheld device;
 a transparent or translucent screen positioned between the stage space and the handheld device;
 a plurality of light emitters directed toward the transparent or translucent screen;
 a sensor configured to monitor an orientation of the handheld device; and
 a controller configured to:
  receive sensor feedback from the sensor indicative of the orientation of the handheld device;
  determine, based on the sensor feedback, a location in the stage space toward which the handheld device is pointed;

select at least one light emitter of the plurality of light emitters based on the location; and activate the at least one light emitter to emit light onto the transparent or translucent screen such that a Pepper's Ghost effect is simulated at the location.

10. The entertainment system of claim 9, wherein the plurality of light emitters is arranged in a grid, and the controller is configured to:

determine a row and a column of the grid based on the location;

select the at least one light emitter residing at the row and the column; and activate the at least one light emitter to emit the light onto the transparent or translucent screen such that the Pepper's Ghost effect is simulated at the location.

11. The entertainment system of claim 9, comprising a microphone communicatively coupled with the controller and configured to detect an audio or voice command from an operator of the handheld device, wherein the controller is configured to receive data feedback from the microphone indicative of the audio or voice command, and wherein the controller is configured to control the at least one light emitter in response to the data feedback from the microphone.

12. The entertainment system of claim 11, comprising a foldable housing having a plurality of foldable walls defining an audience compartment in which the handheld device is disposed, a mid-section compartment in which the transparent or translucent screen is disposed, a stage compartment in which the stage space is disposed or defined, and a dark compartment in which the plurality of lights is disposed, wherein the audience compartment, the mid-section compartment, and the stage compartment are disposed in a line such that the mid-section compartment is between the audience compartment and the stage compartment, wherein the dark compartment is connected to the mid-section compartment and offset from the line, and wherein the plurality of foldable walls is foldable into a stack via hinged joints connecting the plurality of foldable walls.

13. An interactive Pepper's Ghost system, comprising:
a stage space;
a handheld device configured to be held by an operator;
a transparent or translucent screen positioned between the stage space and the handheld device;
a sensor configured to monitor an orientation of the handheld device;
a microphone configured to detect voice audio from the operator; and
a controller configured to:
receive first data feedback indicative of the orientation of the handheld device from the sensor;
determine, based on the first data feedback, a location in the stage space toward which the handheld device is pointed;
receive second data feedback indicative of the voice audio from the operator;
determine, based on the second data feedback, a voice command of a plurality of available voice commands; and
activate, based on the location determined by the controller and the voice command determined by the controller, at least one light emitter of a plurality of light emitters such that the at least one light emitter emits light onto the transparent or translucent screen to generate a Pepper's Ghost effect to simulate an effect at the location.

14. The interactive Pepper's Ghost system of claim 6, comprising a physical show object disposed in the stage space, wherein the controller is configured to control a physical movement of the physical show object, and wherein the controller is configured to cause the physical movement of the physical show object to coincide with the effect.

15. The interactive Pepper's Ghost system of claim 13, wherein the controller is configured to:
receive third data feedback indicative of an additional orientation of the handheld device from the sensor, the additional orientation being different than the orientation;
determine, based on the third data feedback, an additional location in the stage space toward which the handheld device is pointed, the additional location being different than the location; and
activate, based on the additional location determined by the controller, at least one additional light emitter of the plurality of light emitters such that the at least one additional light emitter emits additional light onto the transparent or translucent screen to generate an additional Pepper's Ghost effect to simulate an additional effect at the additional location.

16. The interactive Pepper's Ghost system of claim 13, wherein the plurality of light emitters is arranged in a grid, and the controller is configured to:
determine a row and a column of the grid based on the first data feedback;
select the at least one light emitter residing at the row and the column; and
activate the at least one light emitter such that the at least one light emitter emits the light onto the location of the transparent or translucent screen to generate the Pepper's Ghost effect.

* * * * *